(12) United States Patent
Pruitt

(10) Patent No.: US 7,492,356 B1
(45) Date of Patent: Feb. 17, 2009

(54) INTEGRATED LIGHTED KEYPANEL

(75) Inventor: James S. Pruitt, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 715 days.

(21) Appl. No.: 11/187,418

(22) Filed: Jul. 22, 2005

(51) Int. Cl.
G06F 3/02 (2006.01)
(52) U.S. Cl. .................. 345/172; 345/102; 345/207
(58) Field of Classification Search ............... 345/102, 345/172, 207; 340/971–980; 362/470, 471
See application file for complete search history.

(56) References Cited

U.S. PATENT DOCUMENTS

| | | | | |
|---|---|---|---|---|
| 5,461,547 A * | 10/1995 | Ciupke et al. | ............... | 362/617 |
| 5,563,622 A * | 10/1996 | Person et al. | ............... | 345/75.1 |
| 5,676,456 A | 10/1997 | Sharp | | |
| 5,933,089 A * | 8/1999 | Katada | .................. | 340/7.55 |
| 6,247,825 B1 * | 6/2001 | Borkowski | .................. | 362/23 |
| 6,519,584 B1 | 2/2003 | Tognazzini | | |
| 2002/0085366 A1 * | 7/2002 | Angell et al. | ................. | 362/23 |
| 2003/0138132 A1 * | 7/2003 | Stam et al. | .................. | 382/104 |
| 2004/0145558 A1 * | 7/2004 | Cheng | ...................... | 345/102 |
| 2004/0257490 A1 * | 12/2004 | Ho | .............................. | 349/58 |
| 2005/0264529 A1 * | 12/2005 | Morgan et al. | ............. | 345/160 |
| 2006/0274540 A1 * | 12/2006 | Klaver et al. | ................ | 362/479 |

* cited by examiner

*Primary Examiner*—Marvin M Lateef
*Assistant Examiner*—Carolyn R Edwards

(57) ABSTRACT

A lighted keypanel equipped with a processor that integrates switch sensing, panel lighting control, and brightness (including ambient light compensation) to reduce cost and simplify interfaces of systems using the lighted keypanel. The lighted keypanel is particularly adaptable for use with a cockpit display.

19 Claims, 5 Drawing Sheets

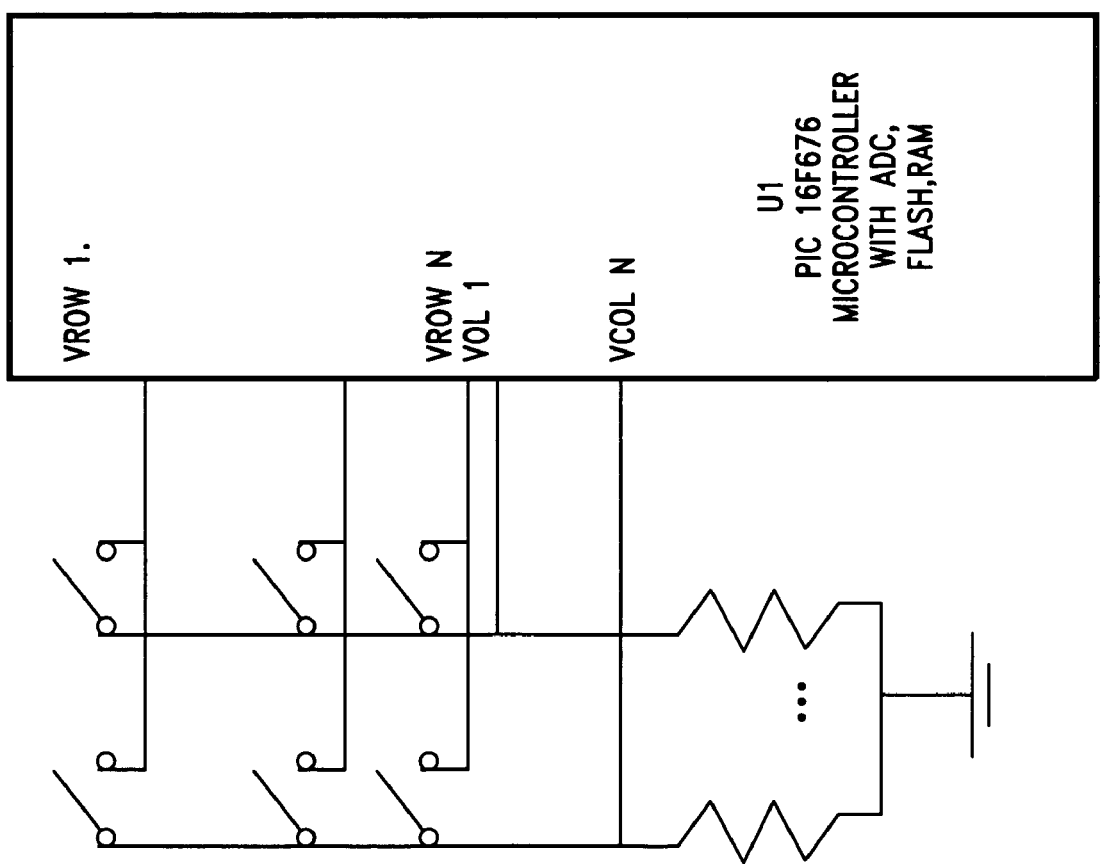

INTEGRATED LIGHTED KEYPANEL

BACKGROUND OF THE INVENTION

1. Field of the Invention

The present invention relates to lighted control panels for data entry and control used in day and night operation. More particularly, the invention applies to lighted switch panels used around the periphery of information displays used in cockpits and vehicle crewstations.

2. Description of the Related Art

Current lighted switch panels (i.e. "bezels" or "keypanels") in aircraft using incandescent lighting are unreliable, require high power (>12 Watts), and require fragile, expensive "flex" cables to connect to the backlight driver. LED lighting has been used to reduce power and improve reliability, but it does not adequately match the dimming curve of incandescent lamps, as will be disclosed below in more detail. Luminance also varies among units, which makes brightness difficult to match in the cockpit. The bezel light sensors also require calibration at the unit top level, and recalibration if a bezel is replaced.

Vehicle crewstation lighting typically consists of multiple display and control panels, each with their lighting. This lighting is typically provided within each device by incandescent light bulbs with special filters that limit their infrared emissions so that they do not interfere with the crew's night-vision-goggles. This lighting is generally referred to as "panel lighting". The crew uses a "rheostat" or variable voltage source to adjust the panel lighting brightness. This voltage is connected to all control and display units. Since all devices use the same kind of lamps, the brightness among units tracks as the "dimming voltage" is changed.

In addition to panel lighting, crewstations use "multifunction displays" (MFDs) to display essential vehicle information. MFDs use large-active-area cathode ray tubes (CRTs) or liquid crystal displays (LCDs) to convey information. These displays generally vary in size from 3"×3" to 8"×20". Since LCDs are a transmissive technology and do not emit light, LCD based MFDs are illuminated by a backlight (using fluorescent lamps or LEDs) located behind the display.

MFDs typically have illuminated switch panels around the periphery of the CRT or LCD. These panels may have "fixed function" switches (rotary knobs or pushbuttons) with labels on the switch or panel, or "soft keys" with variable functions. Fixed functions provide rapid single-action access to major, critical function. Soft keys are labeled by software in the MFD that draws a word or symbol adjacent to the soft key to label its function. A soft key may take on many different functions depending on the MFD software. This allows each soft key to replace hundreds of fixed function switches dramatically reducing the cockpit area needed for controls. Systems can provide unlimited growth in functions without adding any new controls.

Each display typically has a brightness control for the display, separate from the instrument panel lighting. This is necessary to allow the crew to balance the large, bright display area with the instrument panel lighting for optimum viewability under the current lighting conditions. The switch panel brightness is controlled by the instrument panel rheostat.

Vehicles must operate under a wide range of lighting environments. Ambient illumination can vary from 0.1 fc to 10,000 fc or more. To accommodate the changes in illumination as the vehicle moves, some MFDs use automatic brightness control (ABC). ABC works by measuring the light falling on the switch panel and increasing the LCD or CRT brightness as the ambient illumination increases. This helps keep the display from "washing out" and losing contrast in bright sunlight.

Some of the problems with current MFDs relate to the switchpanel, as discussed below.

1. Incandescent lamps are unreliable, especially in high-vibration environments. As much as 30% of MFD failures are in the incandescent panel lighting. LED lighting is starting to be used, but LEDs do not follow the same dimming curve as lamps. This gives rise to abrupt changes in brightness as the rheostat is adjusted.

2. Panels with over 30 switches are common, requiring a high speed, multiple wire (10 to 16 wire) interface from the switchpanel to the MFD processor. This is often done using a costly flexible wiring board to control signal impedances and reduce electromagnetic interference.

3. The ambient light sensor in the switchpanel uses photodiodes with highly variable sensitivities. They are installed behind diffusers and at variable mounting angles that add further uncertainty in their sensitivity. As a result, each switchpanel has different characteristics. To assure all MFDs track, a calibration process is necessary at the next level of assembly, typically the Display Head level. This means that switchpanels are not interchangeable. To replace a switchpanel the unit has to be recalibrated. This makes field replacement of switchpanels impossible, and increases the cost of ownership.

As will be disclosed below, the invention described herein solves all three problems. It controls reliable LED lighting to make it compatible with other incandescent-lighted units. It eliminates the expensive flex board by using a low-cost controller and serial interface. The light sensor is provided with calibration in the switchpanel using non-volatile memory so all panels have the same characteristics. This ambient light value is sent over the same serial interface used to send key information to simplify the MFD and reduce cost.

SUMMARY OF THE INVENTION

In a broad aspect, the present invention is a lighted keypanel equipped with a processor that integrates switch sensing, panel lighting control, and brightness (including ambient light compensation) to reduce cost and simplify interfaces of systems using the lighted keypanel.

The keypanel includes an enclosure and a plurality of switches mounted to the enclosure. A controller is connected to the switches. An ambient light sensor assembly is connected to the controller for providing an indication of the magnitude of the ambient light. A lighting assembly is connected to the controller for illuminating the lighted keypanel and indicating the location and function of the switches in response to signals from the controller. A dimming control input is connected to the controller for providing a dimming input signal to the controller for dimming as desired. A serial communication input/output channel is connected to the controller for communicating with a desired processing unit. The controller combines data from the plurality of switches, the ambient light sensor assembly, and the dimming control input and provides an output to the serial communication output to the serial bus and to the lighting assembly.

As mentioned above, the present invention solves major problems that were inherent with prior art keypanels for MFDs.

BRIEF DESCRIPTION OF THE DRAWINGS

FIG. 6 is a schematic block diagram of a matrix implementation of switches in a lighted keypanel.

The same elements or parts throughout the figures of the drawings are designated by the same reference characters, while equivalent elements bear a prime designation.

DETAILED DESCRIPTION OF THE INVENTION

Figure 1:
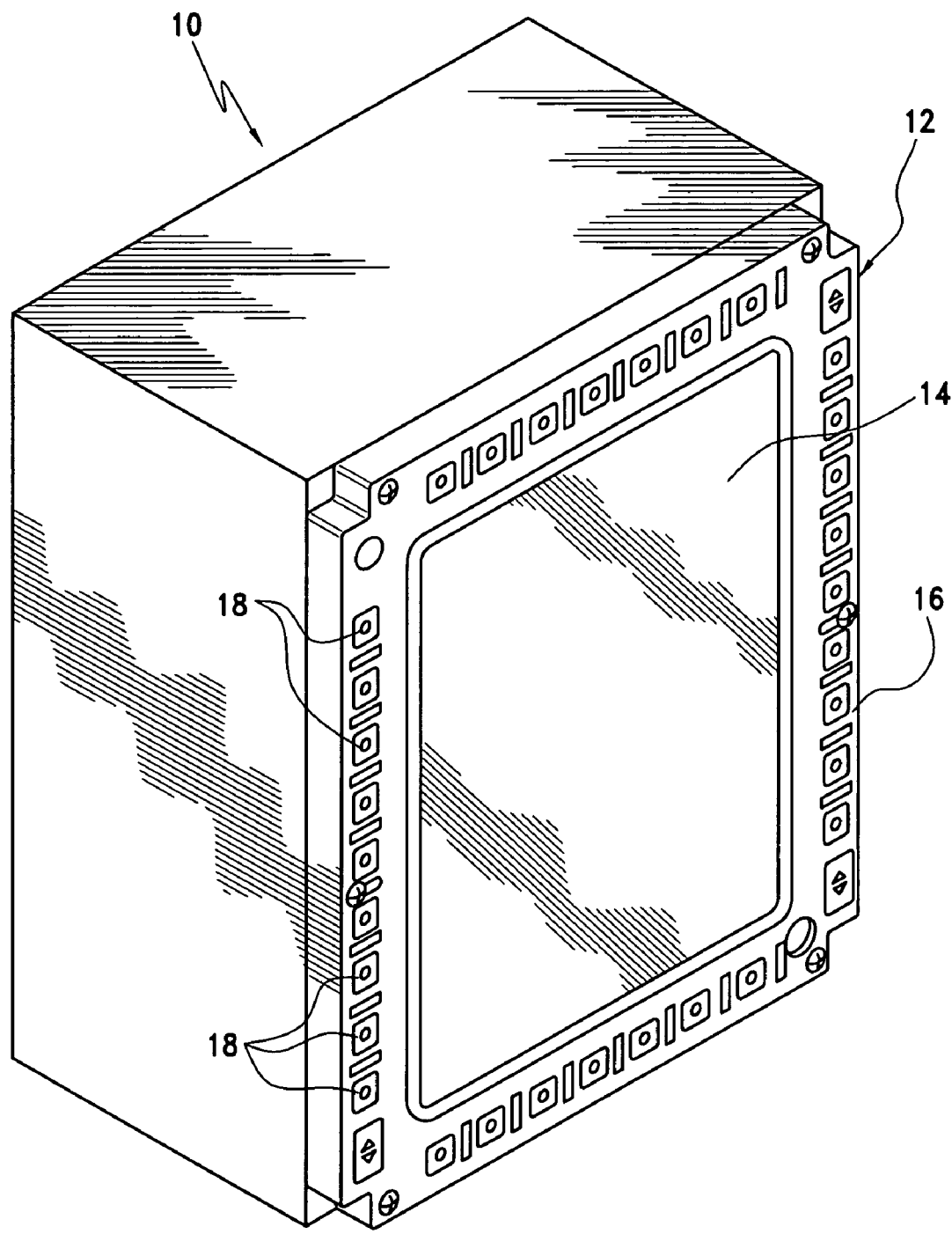
FIG. 1 is a perspective view of a cockpit display assembly incorporating the lighted keypanel in accordance with the principles of the present invention.

Referring now to the drawings and the characters of reference marked thereon, FIG. 1 is a perspective view of a cockpit display assembly, designated generally as 10. The cockpit display assembly 10 includes a lighted keypanel, designated generally as 12; and, a cockpit display 14 positioned within a central opening of the cockpit display assembly 10. The lighted keypanel 12 includes an enclosure that includes a frame 16 that has a number of spaced switch openings for providing access to plurality of switches 18. The switches 18 may be fixed-function switches, switches with software programmable functions, rotary switches, etc. As will be explained in more detail below, if a large number of switches are used they may be arranged in a matrix.

Figures 2, 3:
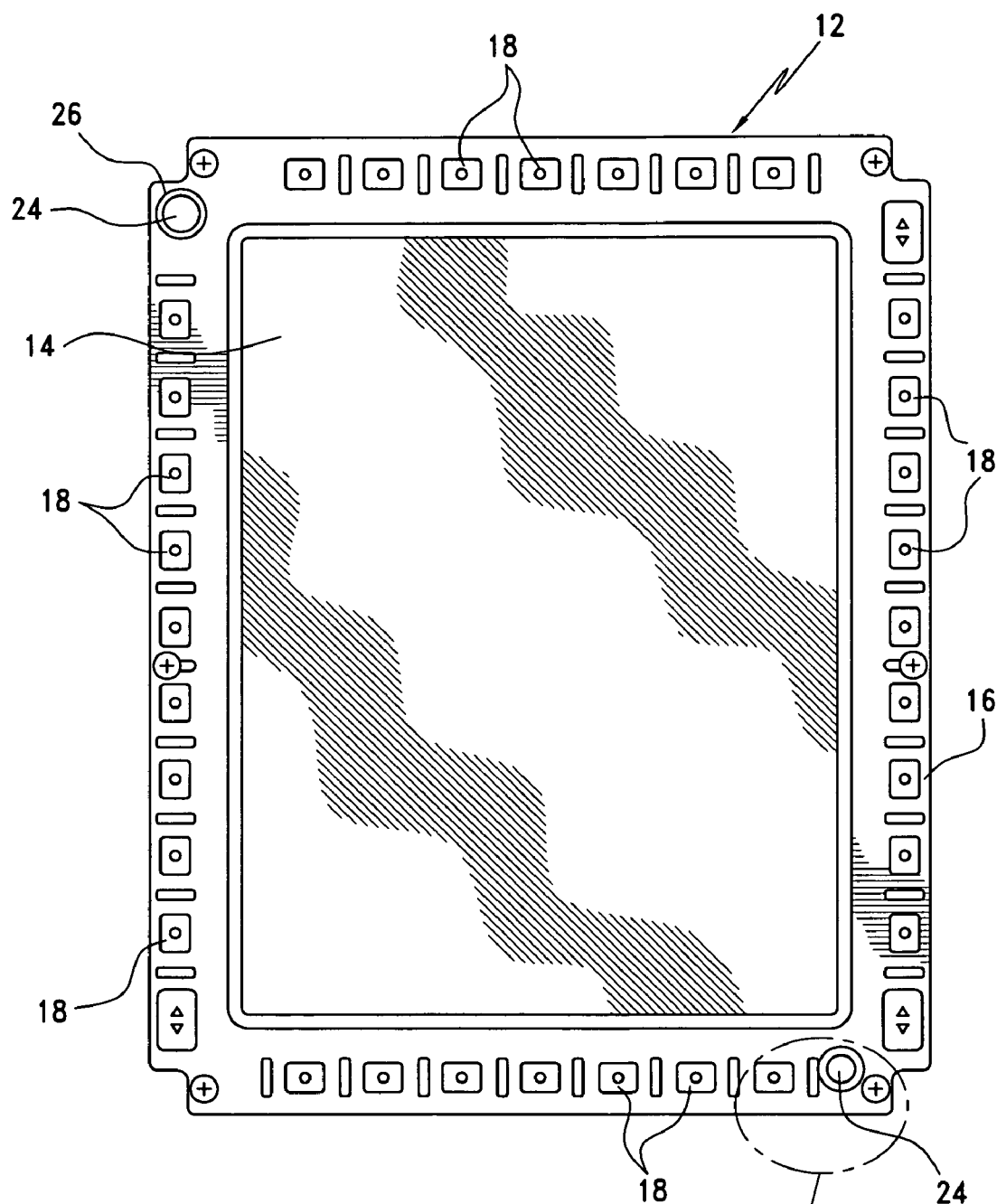
FIG. 2 is a front view of the lighted keypanel showing certain components hidden from view, in phantom.
FIG. 3 is a cutaway enlarged view of a portion of the lighted keypanel.
Figures 3, 4:
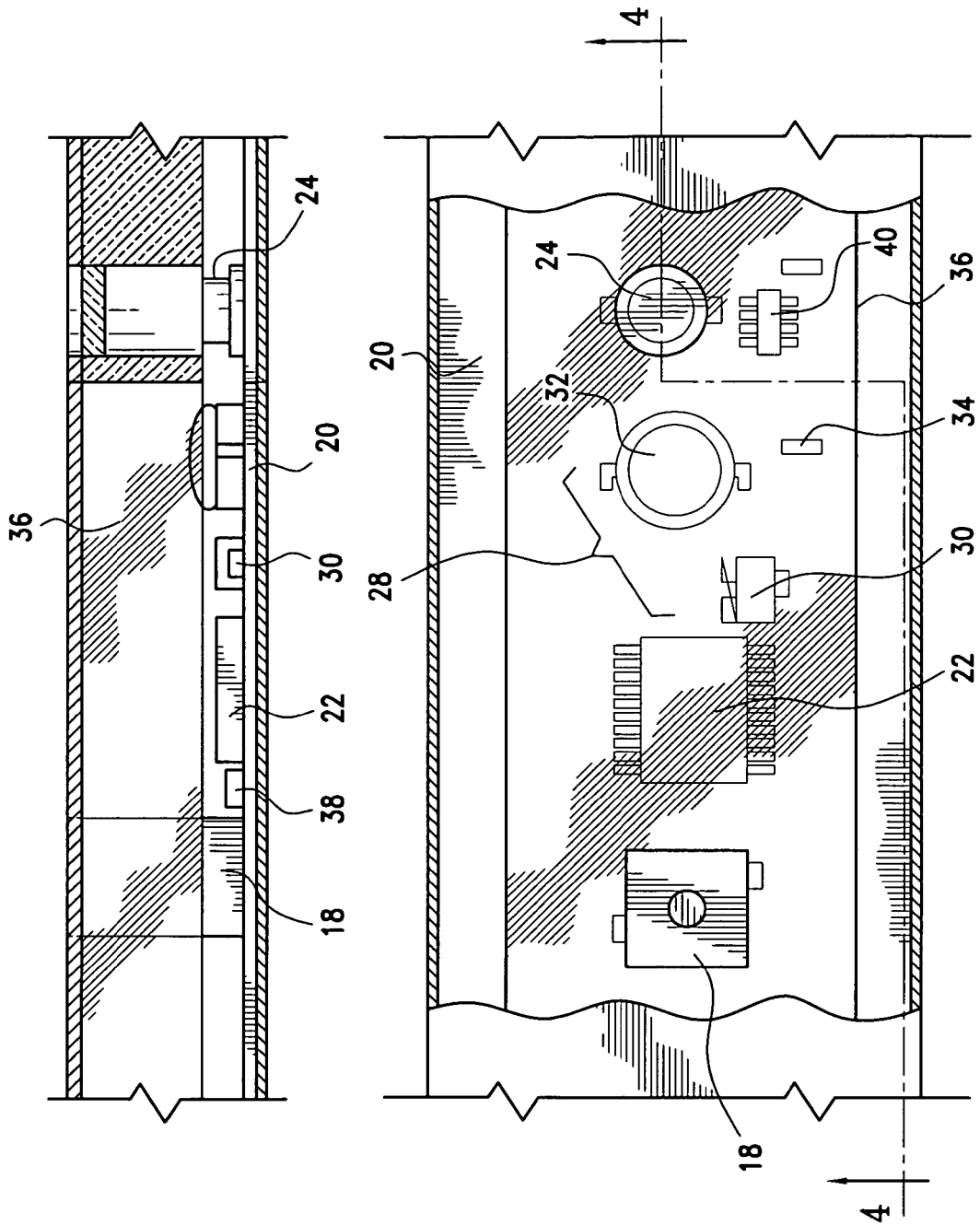
FIG. 4 is a cross-sectional view along line 4-4 of FIG. 3.

Referring now to FIGS. 2-4, the lighted panel 12 is shown in various views. The lighted panel enclosure includes a printed wiring board 20. This supports a controller 22. The controller 22 is preferably a microcontroller; however, it may be programmable logic device. Either implementation includes the ability to read analog voltages and discrete switch levels; read and write to internal (or external) nonvolatile memory; apply scale factors from nonvolatile memory to the analog readings; provide switched binary outputs with pulse-width control on the outputs; and, format and transmit and receive serial digital data.

Figure 5:
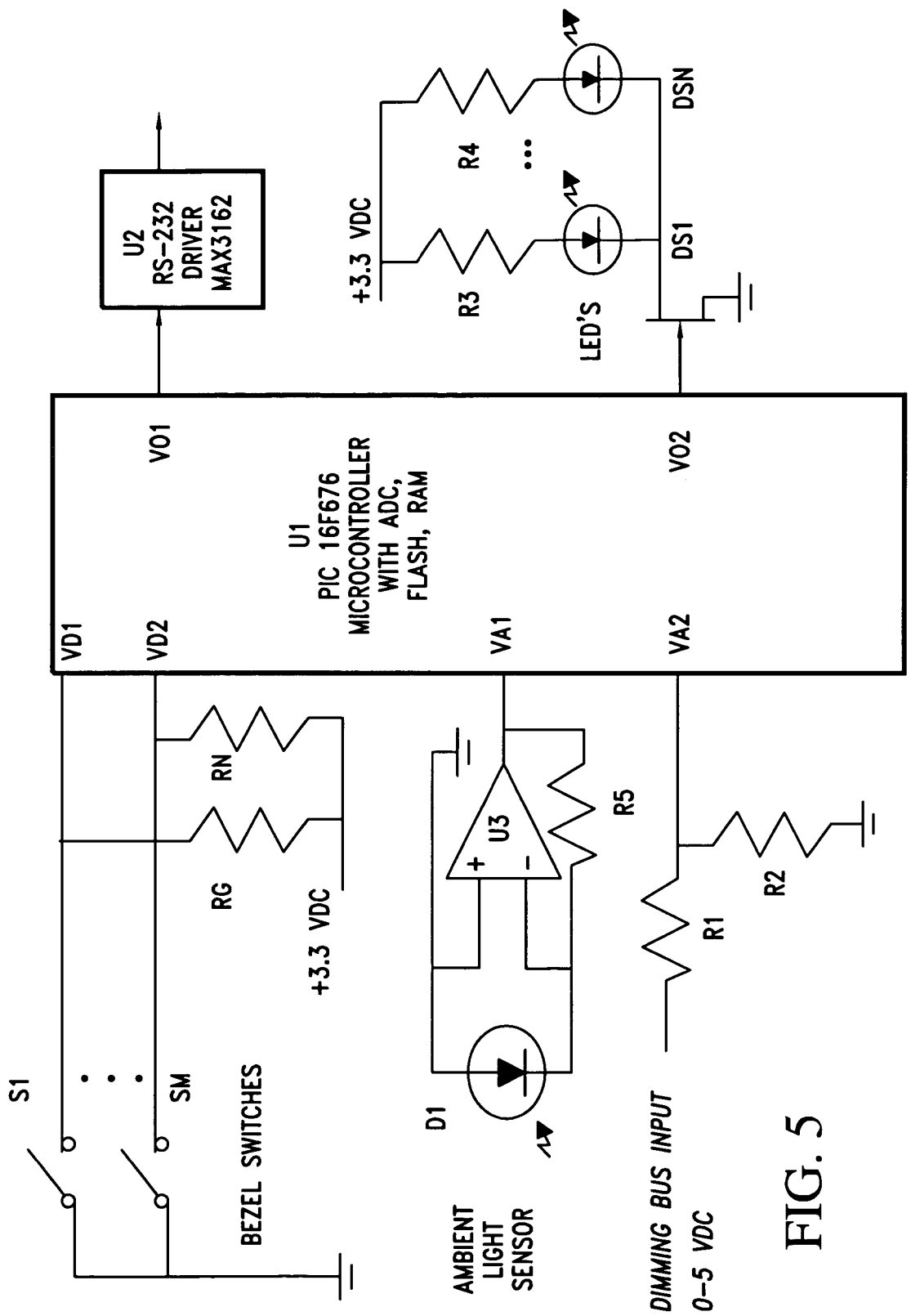
FIG. 5 is schematic block diagram illustrating the operation of the various components of the lighted keypanel.

An ambient light sensor assembly 24 is connected to the controller 22 (as shown in FIG. 5) for providing an indication of the magnitude of the ambient light. The ambient light sensor assembly 24 includes a lensed opening 26 in the enclosure that allows ambient light to be sensed for control of the cockpit display 14, as will be explained below in detail.

A lighting assembly, designated generally as 28 is connected to the controller 22 for illuminating the lighted keypanel 12 and indicating the location and function of the switches 18 in response to signals from the controller 22. The lighting assembly 28 includes a number of light emitting diode (LED) drivers 30 in communication with the controller 22. These LED drivers 30 are in communication with associated LED's 32. Current limiting resistors 34 provide the required intensity of LED illumination.

A light waveguide 36 causes the light from the LEDs 32 to be distributed to illuminate the panel markings. FIGS. 2-4 illustrate the use of soft keys 18. Transparent plungers on the pushbutton switches 18 channel the light from the waveguide 36 to clear areas on the key "caps" illuminating them. This facilitates finding the keys at night.

As will be disclosed in detail below, a dimming control input 38 is connected to the controller 22 for providing a dimming input signal to the controller 22 for dimming as desired. A serial communication input/output channel is connected to the controller 22 for communicating with a desired processing unit. The processing unit may be, for example, a computer with system data interfaces and an image generation capability. It reads system inputs and commands the image generator to output the desired image to the display.

Referring now to FIG. 5, an example circuit is illustrated. A plurality of switches (S1 through SM) are mounted to the enclosure. Each switch is grounded on one side, with the other contact connected to a discrete logic-level input (VD1, VDN) of the microcontroller U1. Each input is pulled up to 3.3 VDC by a resistor (R1 through RN) which convert the open/closed switch action into a 3.3 Volt/volt logic input that can be sensed by the microcontroller. U1 converts the switch action into a unique character that is then transmitted on the serial output to the processor.

As can be seen in FIG. 6, if a large number of switches are used then they may be arranged in a matrix to minimize the number of pins and size of U1. U1 samples the state of each switch by exciting to a logic 1 state (3.3 VDC) a single row and sensing all the column inputs. If a switch at an intersection of a row and column is closed then a logic 1 will be sensed. Otherwise the pull-down resistors will cause a logic 0 (ground) to be sensed. When all the rows have been excited, then the entire matrix of switches will have been sampled. The row and column of the closed switches are encoded and transmitted on the serial output. A level shifter (U2) converts the U1 output VO1 to standard serial protocol (RS-232) levels.

The lensed opening in the enclosure allows ambient light to reach photodiode 24 (D1). D1 generates a current into U3 (also shown by numeral designation 40 in FIG. 3) as a result of this light energy. U3 converts the current to a voltage using R5. This voltage is applied to one of the analog input pins, VA1, of the microcontroller. The microcontroller multiplies this voltage by a calibration factor stored in its Flash memory to create the output voltage. The controller 22 (i.e., U1) encodes the voltage into a series of binary characters and transmits these on the serial output to the processor for control of the display brightness.

The calibration factor is loaded into controller 22 during production testing so that all units provide the same output for a given light input. In applications where a large light range or higher accuracy is needed the input voltage may use multiple amplifiers with different gains. Controller 22 would then choose the greatest valid value to provide the most accurate output.

The dimming bus control input, 0 to 5 VDC, is scaled to a 0 to 3.3 VDC range (compatible with U1) by the voltage divider formed by R1 and R2. U1 digitizes this input on its analog input pin VA2. U1 converts this bezel brightness command value to an LCD on-time and off-time using a lookup table stored in its Flash memory. U1 then drives its output pin VO2 high for the on-time duration, then drives this pin low for the off-time duration. During the on-time the Field Effect Transistor conducts, causing current to flow in all the LEDs in the lighting assembly. The LEDs are off during the off-duration. This pulsing of the LED light occurs over 100 times per second, making it appear that the LEDs are always on, but at a reduced brightness. The light waveguide causes the light from the LED to be distributed to illuminate the panel markings. Transparent plungers on the pushbutton switches channel the light from the waveguide to clear areas on the key "caps" illuminating them. This facilitates finding the keys at night. Thus, the dimming voltage adjusts the LED brightness. Non-linear values are used in the lookup table so that the dimming mimics the brightness variation of other cockpit incandescent lighting.

The controller sends information to the processor so that the processor may implement automatic brightness control of the display backlight. Automatic brightness is implemented as a software process in the MFD processor. The user selects a desired brightness level using the bezel brightness switches. The controller in the smart bezel transmits this level and a measurement of the ambient light striking the bezel. The MFD then computes a backlight brightness value and commands the backlight to output this brightness. As the ambient illumination increases the processor commands increasing brightness. A logarithmic software algorithm can be implemented to make the brightness change match the logarithmic response of the eye. The result is that the display brightens and the ambient illumination increases, maintaining the difference in display and background luminance for the most readable display.

The bezel, i.e. switch panel, may contain "dedicated switches" and "soft keys" for user input. Dedicated switches are controls that have the same function regardless of the information displayed. Examples of dedicated switches include the display brightness and contrast controls. Soft keys are momentary action pushbutton switches located around the periphery of the display. Their function changes depending on the displayed information. The processor labels the soft key by drawing text or a symbol in the display area adjacent to the key. This allows one soft key to control many functions, depending on the "context" presented by the display. This can eliminate hundreds of fixed-function switches, saving instrument panel area and cost. The controller senses the states of all dedicated and soft key controls and transmits this data on its serial input output bus for use by the MFD processor.

The controller can have the ability to selectively energize areas of bezel illumination to provide information to the user. The serial input output bus allows the MFD processor to command lighting of all switches and bezel markings, or to only illuminate a subset of this illumination. For example, a warning legend can be backlight using red LEDs and energized by the controller when commanded from the MFD processor. This indication would be available regardless of the displayed "page". Another example would illuminate only the soft keys that are active for a given display page. This can help cue the operator to more rapidly select functions, especially when the display is filled with text.

The controller can be provided with nonvolatile memory (NVM) to allow each unit to be calibrated to the same performance level. This consistency is essential to have bezels that need no expensive, higher-unit-level adjustments after installation. This interchangeability is a key to mass production. After each bezel is manufactured, its performance (e.g., bezel lighting versus command, ambient light sensor output versus illumination) is measured. An external computer at the test station calculates correction factors necessary to provide the "standard" bezel output levels. The computer sends these factors to the bezel controller using the serial input output bus. The controller stores the data in NVM and thereafter applies these factors to its inputs. In this way each bezel's controller corrects for individual unit variations in LED and light sensor characteristics.

Other embodiments and configurations may be devised without departing from the spirit of the invention and the scope of the appended claims.

What is claimed is:

1. A lighted keypanel, comprising:
   a) an enclosure;
   b) a plurality of switches mounted to said enclosure;
   c) a controller connected to said switches;
   d) an ambient light sensor assembly connected to said controller for providing an indication of the magnitude of the ambient light;
   e) a lighting assembly connected to said controller for illuminating the lighted keypanel and indicating the location and function of said switches in response to signals from said controller;
   f) a dimming control input connected to said controller for providing a dimming input signal to said controller for dimming as desired; and,
   g) a serial communication input/output channel connected to said controller for communicating with a desired processing unit,
   wherein, said controller combines data from said plurality of switches, said ambient light sensor assembly, and said dimming control input and provides an output to said serial communication input/output channel and to said lighting assembly.

2. The lighted keypanel of claim 1, wherein said controller comprises a microcontroller.

3. The lighted keypanel of claim 1, wherein said controller comprises a programmable logic device.

4. The lighted keypanel of claim 1, wherein said controller causes the brightness of the lighting assembly to be controlled by said dimming input signal in a manner that simulates an incandescent lighting curve so that the brightness tracks surrounding incandescent lighting.

5. The lighted keypanel of claim 4, wherein said controller controls the brightness by periodically digitizing said dimming input signal, and uses this value as an index in a lookup table containing a corresponding on-time duration to excite the lighting assembly, thus generating a desired dimming curve.

6. The lighted keypanel of claim 1, wherein said controller includes an automatic brightness algorithm, so that said serial communication input/output channel conveys the commanded display brightness, simplifying an external display backlight.

7. The lighted keypanel of claim 1, wherein said plurality of switches comprises soft keys and dedicated switches, said controller sensing the state of said soft keys and dedicated switches and transmitting this on said serial communication input/output channel to said processing unit for control of the content of an associated display.

8. The lighted keypanel of claim 1, wherein said controller receives lighting commands from said serial communication input/output channel and selectively energizes portions of said lighting assembly to cue selected controls as active to the user.

9. The lighted keypanel of claim 1, wherein said controller is provided with nonvolatile memory loaded with unit-specific calibration data after manufacture, wherein this data is used by the controller to adjust the transmitted ambient light data to correct unit-to-unit variations in the ambient light sensor and provide a uniformly accurate output from all units.

10. The lighted keypanel of claim 1, wherein said plurality of switches comprises fixed-function switches.

11. The lighted keypanel of claim 1, wherein said plurality of switches comprises switches with software programmable functions.

12. The lighted keypanel of claim 1, wherein said plurality of switches comprises rotary switches.

13. The lighted keypanel of claim 1, wherein said lighting assembly, comprises;
   a) a plurality of light emitting diode (LED) drivers in communication with said controller;
   b) a plurality of LED's in communication with said LED drivers; and,
   c) a plurality of current limiting resistors connected to associated LED's of said plurality of LED's for providing the required intensity of LED illumination.

14. The lighted keypanel of claim 1, wherein said enclosure comprises a frame including a plurality of spaced openings for providing access to said plurality of switches.

15. The lighted keypanel of claim 1, wherein said enclosure comprises a frame including a plurality of spaced switch openings for providing access to said plurality of switches, said frame including a central display opening for a cockpit display.

16. The lighted keypanel of claim 1, wherein said enclosure comprises a frame including a plurality of spaced switch openings for providing access to said plurality of switches, said frame including a central display opening for a cockpit display, wherein said plurality of switches, said controller, and said lighting assembly are mounted on and operatively connected via a printed wiring board.

17. The lighted keypanel of claim 1, wherein said lighting assembly comprises a light-transmitting waveguide for transmitting light to said switches.

18. The lighted keypanel of claim 1, wherein said enclosure is for a cockpit display assembly.

19. A cockpit display assembly, comprising:
   a) lighted keypanel, comprising:
      i. an enclosure;
      ii. a plurality of switches mounted to said enclosure;
      iii. a controller connected to said switches;
      iv. an ambient light sensor assembly connected to said controller for providing an indication of the magnitude of the ambient light;
      v. a lighting assembly connected to said controller for illuminating the lighted keypanel and indicating the location and function of said switches in response to signals from said controller;
      vi. a dimming control input connected to said controller for providing a dimming input signal to said controller for dimming as desired; and,
      vii. a serial communication input/output channel connected to said controller for communicating with a desired processing unit,
         wherein, said controller combines data from said plurality of switches, said ambient light sensor assembly, and said dimming control input and provides an output to said serial communication input/output channel and to said lighting assembly; and,
   b) a cockpit display positioned within a central opening of said cockpit display assembly.

* * * * *